United States Patent [19]

Levy et al.

[11] 4,306,307
[45] Dec. 15, 1981

[54] METHOD OF REDUCING PHASE NOISE AT THE RECEIVER END OF A DATA TRANSMISSION SYSTEM

[75] Inventors: Michel Lévy, Massy; Christian Poinas, Boulogne, both of France

[73] Assignee: Compagnie Industrielle des Telecommunications CIT-ALCATEL, Paris, France

[21] Appl. No.: 144,098

[22] Filed: Apr. 28, 1980

[30] Foreign Application Priority Data

Apr. 27, 1979 [FR] France .................. 79 10808

[51] Int. Cl.³ .............. H03H 15/02; H03K 5/159
[52] U.S. Cl. .................................. 375/15; 375/39; 375/99; 329/104; 333/18; 328/164
[58] Field of Search ........... 328/162, 166; 329/104, 329/133; 333/18; 364/724, 574, 480; 370/6, 21; 375/12, 15, 39, 99, 101, 102; 455/296, 305

[56] References Cited

U.S. PATENT DOCUMENTS

| | | | |
|---|---|---|---|
| 3,868,603 | 2/1975 | Guidoux | 375/15 |
| 3,971,996 | 7/1976 | Motley | 375/39 |
| 3,974,449 | 8/1976 | Falconer | 375/14 |
| 4,053,837 | 10/1977 | Ryan et al. | 375/15 |
| 4,091,331 | 5/1978 | Kaser et al. | 329/110 |

FOREIGN PATENT DOCUMENTS 2296315 7/1976 France .
2354003 12/1977 France .
2408949 6/1979 France .

OTHER PUBLICATIONS

"National Telecommunications Conference" Nov. 29, 30 & Dec. 1, 1975, N.Y., N.Y., Levy-Auto Adaptive Equalizer . . . pp. 45.2-1 to 45.2-3.
IEEE International Conference on Communications; Jun. 11-13, 1973, N.Y., NY; Gibson "Coherent SSBSC Reception . . . " pp. 2-31-35.

*Primary Examiner*—Benedict V. Safourek
*Attorney, Agent, or Firm*—Sughrue, Mion, Zinn, Macpeak and Seas

[57] ABSTRACT

Data in the form of multi-value symbols is transmitted at a symbol rate $1/\Delta T$. At the receiver a decision circuit supplies estimates of the transmitted symbols on the basis of the received symbols. The present invention concerns compensating phase noise after equalization, if any, of the received symbols and before application of the received symbols to the decision circuit (38, 39). The received symbols are in complex form with in-phase and quadrature components $y_k'$ and $y_k''$ respectively. Phase noise is compensated by complex multiplication in a multiplier (36) of the received symbols by a complex coefficient $m_k$

$$m_{k+1} = [m_k - \lambda(v_k - \hat{a}_k)y_k^*]\exp[-iF_k(\epsilon_j)]$$

where:
 $\lambda$ is a real coefficient;
 $y_k^*$ is the complex conjugate of the symbol received at instant $k\Delta T + t_o$ (where $t_o$ is the instant taken as the origin of time measurements);
 $v_k$ is the symbol applied to the decision circuit at said instant;
 $\hat{a}_k$ is the estimated value of the received symbol;
 $\epsilon_j$ is an error signal derived from the phase difference between the symbol applied to the decision circuit and the symbol estimated by the decision circuit at instant $j\Delta T + t_o$; and
 $F_k(\epsilon_j)$ is a linear function of at least the error signals $\epsilon_j$.

The invention is particularly applicable to quadrature modulation systems, but if only one channel is transmitted the quadrature channel can be simulated using the Hilbert transform of the one channel.

7 Claims, 5 Drawing Figures

FIG. 4

METHOD OF REDUCING PHASE NOISE AT THE RECEIVER END OF A DATA TRANSMISSION SYSTEM

The present invention relates to synchronous data transmission via a band-limited transmission channel, and concerns the elimination of distortion which gives rise to errors at the receiver end in estimating the symbols originally transmitted and thereby limits the binary transmission rate.

BACKGROUND OF THE INVENTION

H. Nyquist has shown that the rate of transmission through an ideal low-pass network cannot exceed two data pulses per hertz of passband, and that this theoretical limit can be approached by a transmission channel whose overall behaviour for data pulses is analogous to that of a gradual cut-off low-pass filter having a linear phase characteristic. That is why when seeking to provide data transmission at a high binary rate, one is constrained firstly to reduce the speed of transmission by replacing, for transmission purposes, binary data by multi-value symbols, and secondly to bring the characteristics of the link used by the transmission close to those of a gradual cut-off low-pass filter having a linear phase characteristic by such means as a shaping filter, modulation if so required, and correction of the distortion applied to the useful band by the link as set up for transmission.

The possibilities for correcting the distortion applied to the useful band by the link as set up for transmission depend on whether or not modulation has been used, and on the manner in which the binary data are replaced by multi-value symbols.

If there is no modulation, the correction is performed on the multi-value symbol. Whereas if there is modulation, the correction may be performed either before demodulation on the signal received from the transmission channel, or else after demodulation on the received mutli-value symbols.

The binary data train to be transmitted is replaced either by a single string of real multi-value symbols sent at a lower rate, or by a string of pairs of real multi-value symbols sent at a lower rate and transmitted simultaneously via two independent channels in quadrature. The first option is to be found in particular in base band transmission systems or in systems which use single, or residual, sideband amplitude modulation, the second option is to be found in data transmission using amplitude modulation of two carriers in guadrature or similar systems such as four or eight state phase-jump transmission or combined phase and amplitude modulation. When correction is performed on the received symbols, it is performed, as the case may be, on one channel or on two parallel channels which were transmitted in quadrature. Given the use of two channels in quadrature, it is possible to reduce the second option to the first by considering each pair of real symbols to be the real and the imaginary parts of a single complex symbol, and by replacing real values in the first option calculations by complex values.

The distortion occurring in the useful band is constituted firstly by slowing varying amplitude distortion and group propagation delay distortion of the transmission channel, and secondly by more rapidly varying phase noise.

The amplitude and group propagation delay distortion of the transmission channel is corrected by means of a filter whose characteristics in the useful band are the inverse of those of the transmission channel, whereby an overall flat response in the useful band is obtained both for amplitude and for phase linearity. It is known to use self-adaptive linear equalizers for this purpose, the basic structure of the equalizers being a time-domain transversal filter as described by K. E. Kalmann, with coefficients being varied in such a manner as to minimize the error between the received symbols and their exact values or their estimated values. Such equalizers adapt automatically to the characteristics of a transmission channel during a learning period during which the data train is replaced by a test sequence known at the receiver end, and thereafter adaptation continues throughout data transmission in response to the slow variations in the characteristics of the transmission channel.

One particular self-adaptive linear equalizer of the type mentioned above, and used to process a single channel, (after demodulation if required) comprises a time-domain transversal filter whose multiply-tapped delay line has a unit time interval equal to the period separating two symbols at the transmitter end, and whose coefficients are adapted constantly by feed-back control loops tending to minimize the mean square error by a gradient algorithm defined by a linear equation of first order differences between real magnitudes.

The above-mentioned self-adaptive linear equalizer, originally intended for a single channel, has a complex version for use with two channels in quadrature. This complex version can be deduced by using the "complex/real" correspondance mentioned earlier, and may be decomposed into four time-domain transversal filters disposed in a trellis configuration, having the same sets of co-efficients in pairs and whose outputs are interconnected in pairs, one pair via a subtractor and the other via an adder. The feed-back loops which tend to minimize the mean-square error employ a gradient algorithm defined by the same linear equation of first order differences, but this time between complex magnitudes.

This complex version of the above-mentioned self-adaptive linear equalizer is also used for processing a single channel instead of using the version based on one transversal filter. To do this, the single channel is associated with a quadrature channel to which there is applied the Hilbert transform of the signal from the single channel.

The relative amplitude of phase noise increases with transmission rate. The level of phase noise on the telephone network is acceptable for conversation or for low rates of data transmission (1,200 bits/s), but it becomes problematic for data transmission at a high rate (9,600 bits/s). It may include the following diverse components:

frequency drift, stemming, for example, from modulation followed by demodulation using un-synchronized carriers;

a constant phase shift;

a periodic phase shift varying at mains frequency or at one of its harmonics, which is to be found in particular when using carrier cables; and a random phase shift at low frequency with respect to the bandwidth of the channel.

The phase noise can be considered as stemming from variations in the characteristics of the transmission channel. However, except for its DC and very low frequency components, phase noise cannot be eliminated by the linear self-adaptive equalizers used to correct amplitude and group propagation delay distortion in the transmission channel since they converge too slowly. Indeed, the above correction requires self-adaptive equalizers having a long impulse response with respect to that of the transmission channel which, taking the speed of transmission into account, requires the use of many coefficients. Now for stability reasons, the speed of a convergence of a linear self-adaptive equalizer is slower the larger the number of coefficients, and to a first approximation it is inversely proportional to the number of coefficients. For this reason, eliminating phase noise and more generally distortion attributable to rapid variation in the transmission channel must be done by means of additional correction circuits.

For example, at the receiver it is known to dispose a short, single coefficient linear self-adaptive equalizer between a long linear self-adaptive equalizer and a decision circuit which supplies an estimate of the transmitted symbols. It is also known at the receiver end of a digital data transmission system using amplitude modulation of two carriers in quadrature to dispose after the demodulator, a long self-adaptive linear equalizer followed by a self-adaptive complex phase shifter, the phase shift angle being adjusted in such a manner as to minimize the mean square error at its output using an algorithm defined, like that of the equalizer, by a linear equation of first order differences between complex magnitudes.

Both these arrangements are unsatisfactory since, in practice, frequency drifts are encountered which the additional correction circuits are incapable of following. Thus, improvements to the said arrangements have already been proposed; firstly by adding circuits for multiplying the coefficients of the long linear self-adaptive equalizer by the coefficient of the short self-adaptive equalizer in order to limit the amplitude of the corrections required of the short equalizer, however, this requires a large number of calculations to be performed; and secondly by disposing a second self-adaptive complex phase shifter in front of the long self-adaptive complex linear equalizer, likewise provided with a first order phase feed-back loop and having a phase shift angle adjusted to minimize the mean square error at its output, however, the improvement achieved is not sufficient, in particular when there is a large frequency drift.

The aim of the present invention is an improved correction of phase noise, and particularly that due to frequency drift, thereby improving the quality or the rate of a synchronous data transmission through a noisy medium such as the switched telephone network.

SUMMARY OF THE INVENTION

The present invention provides a method of reducing phase noise at the receiver end of a data transmission system operating at a modulation rate $1/\Delta T$ and comprising, at the receiver, a decision circuit for supplying an estimate of the originally transmitted symbols on the basis of the symbols actually received, wherein before application to the decision circuit, the received symbols are put into complex form with an in-phase component and a quadrature component, and are then multiplied by a complex coefficient defined by an equation having the form:

$$m_{k+1} = [m_k - \lambda(v_k - \hat{a}_k)y_k^*]\exp[-iF_k(\epsilon_j)]$$

where:

$\lambda$ is a real coefficient;

$y_k^*$ is the complex conjugate of the symbol received at instant $k\Delta T + t_o$ (where $t_o$ is the instant taken as the origin of time measurements);

$v_k$ is the symbol applied to the decision circuit at said instant;

$\hat{a}_k$ is the estimated value of the received symbol;

$\epsilon_j$ is an error signal derived from the phase difference between the symbol applied to the decision circuit and the symbol estimated by the decision circuit at instant $j\Delta T + t_o$; and $F_k(\epsilon_j)$ is a linear function of at least the error signals $\epsilon_j$.

In a preferred embodiment, the received symbols are delivered by a long self-adaptive complex linear equalizer whose self-adaptation is performed using an error signal derived from the differences between the symbols applied to the decision circuit and the estimates it makes thereof, the said differences being multiplied by the complex conjugates of the said complex coefficients.

The invention also provides apparatus for performing the above method.

BRIEF DESCRIPTION OF THE DRAWINGS

Other characteristics and advantages of the invention will appear in claims and from the following description of an embodiment given by way of example. The description is made with reference to the accompanying drawings in which:

DESCRIPTION OF THE PREFERRED EMBODIMENT

An implementation of the method in accordance with the invention is described below in the context of a synchronous data transmission system using amplitude modulation of two carriers in quadrature (QAM).

Figure 1:
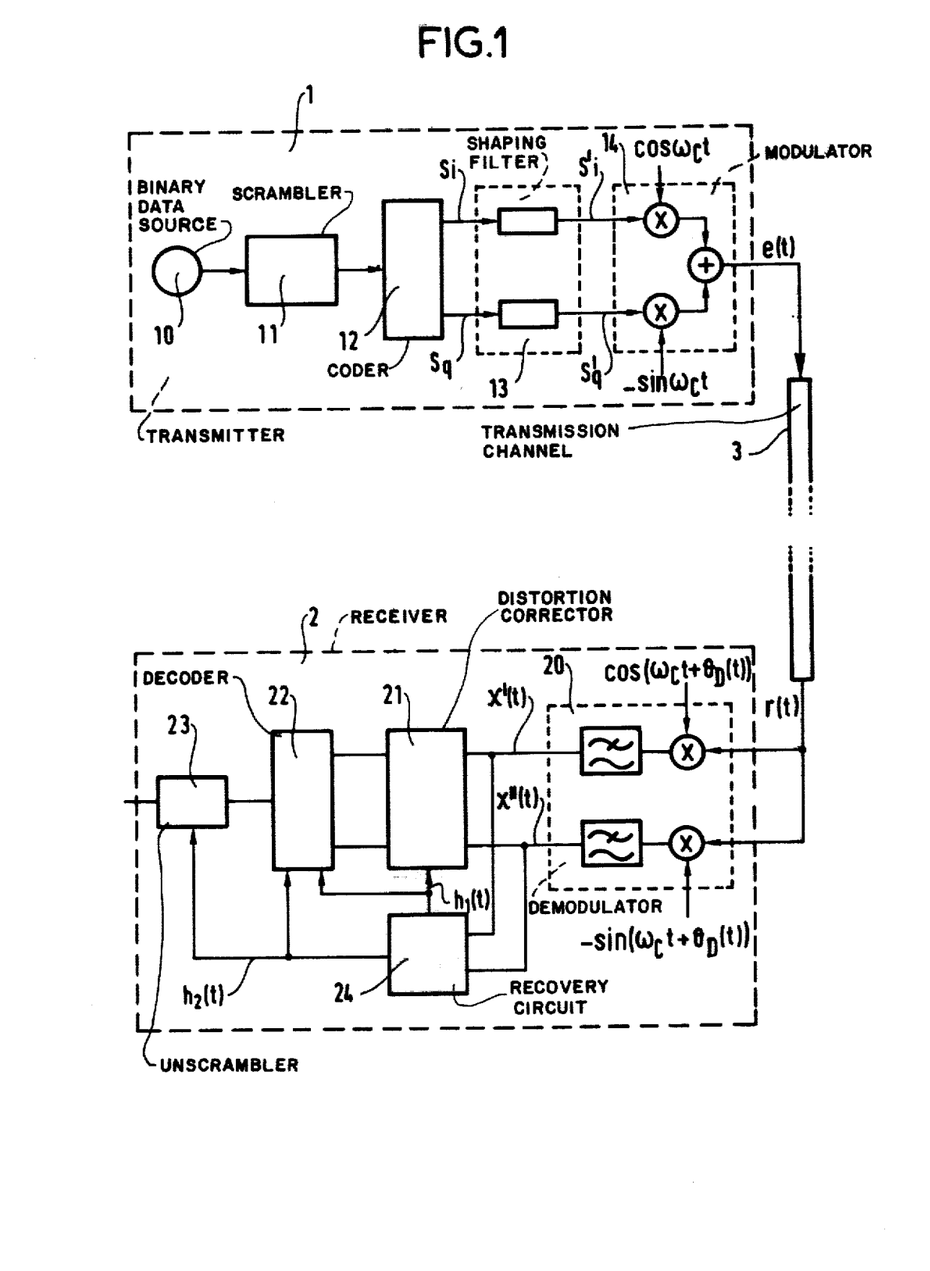
FIG. 1 is a general circuit diagram of a synchronous data transmission system using amplitude modulation of two quadrature carriers.

The purpose of FIG. 1 is to situate the invention in such a system. It outlines a synchronous data transmission system using QAM type modulation.

In FIG. 1 there is a transmitter part 1 connected to a receiver part 2 by a transmission channel 3.

The transmitter part comprises a source of binary data 10 followed by a scambler 11, a coder 12, a shaping filter 13, and a modulator 14.

The source 10 delivers the binary data to be transmitted.

The scrambler 11 sums modulo-2 the binary data from the source 10 with a pseudo-random binary sequence delivered at the same rate. As is well known, this has the effect of evening out the amplitude of the frequency spectrum of the binary data, thereby, inter alia facilitating recovery of the clock rate at the receiver end.

The coder 12 transforms the binary data into complex symbols which are delivered at a slower rate. Using 16 QAM modulation, one complex symbol can take one of four different amplitude levels and one of four different phase levels, and corresponds to a four-bit binary word, thereby making it possible to use a symbol rate or a speed of modulation which is four times less than that of the binary rate. The coder 12 has two outputs at which it applies the in-phase $S_i$ and quadrature $S_q$ symbol components in parallel.

The shaping filter 13, is in fact constituted by two filters in parallel operating on the symbol components and limiting their frequency spectrum in accordance with the criteria laid down by H. Nyquist. For example, these filters may have a raised cosine characteristic.

The modulator 14 is a modulator having two carriers in quadrature. It receives the two filtered components $S_i'$ and $S_q'$ and two versions in quadrature of the transmitter carrier $\omega_c$. At its output it delivers a signal e(t) constituted by the sum of the products of the symbol components multiplied by respective quadrature versions of the transmission carrier.

A band-pass filter, not shown, is often inserted between the modulator 14 and the transmission channel to limit the band of the transmitted signal to that of the transmission channel 3.

The receiver part 2 comprises a demodulator 20 followed by a distortion corrector 21, a decoder 22 and an unscrambler 23. It also includes a clock rate recovery circuit 24 with its input connected to the outputs of the demodulator 20 and its output connected to the distortion corrector 21, to the decoder 22, and to the unscrambler 23.

The demodulator 20, which is often preceded by a filter for limiting the band of the input signal to the receiver part, is a demodulator having two carriers in quadrature. It receives firstly, a signal r(t) from the transmission channel, and secondly two quadrature versions of a receiver carrier at the same angular frequency $\omega_c$ as the transmitter carrier. The receiver carrier is not synchronized on the transmitter carrier and presents a time-varying phase shift $\theta_D$ with respect thereto. On each of two outputs, the demodulator 20 supplies two demodulated signals: an in-phase signal x'(t) and a quadrature signal x''(t).

The clock rate recovery circuit 24 recovers the rate $h_1(t)$ at which the symbols are transmitted, also known as the modulation rate, which rate acts as the clock signal to the distortion corrector 21. The recovery circuit also delivers the binary data rate $h_2(t)$ by using multiplication. In the example under consideration, where the transmission shaping filter 13 has a raised cosine characteristic, the clock recovery circuit operates on the basis of a spectrum line at half the frequency of the modulation rate present in the demodulated signal.

The distortion corrector 21 which is described in greater detail below, acts on the demodulated signals x'(t) and x''(t) to eliminate: firstly both linear amplitude distortion and linear group propagation delay distortion introduced by the transmission channel, and secondly phase noise, particularly frequency drift and phase shift due to the fact that the transmitter and receiver carriers are not synchronized to each other.

The decoder 22 converts the symbols delivered thereto by the distortion corrector 21 into binary form. For this purpose it receives two clock signals, one at the symbol transmission rate and the other at the binary data transmission rate.

At the receiver end, the scrambler 23 reconstitutes the binary data delivered at the transmitter end by the data source 10.

Apart from the distortion corrector, the various circuits which have been listed above will not be described in detail since they do not form part of the present invention and have already been described in numerous articles. Reference could be made, for example on this topic to the book entitled "Principles of data communication" by R. W. Lucky, J. Salz and E. J. Weldon, published by McGraw-Hill in 1968.

Before describing the corrector (21 FIG. 1) it would be useful to recall the principal properties of such equalizers.

Figure 2:
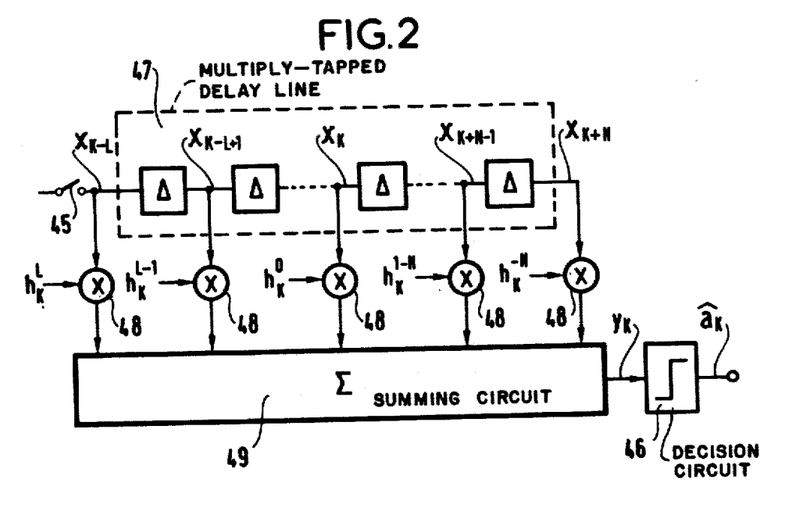
FIG. 2 is a block diagram of an elementary linear equalizer.

A complex linear equalizer is the two channels in quadrature version of the one channel elementary linear equalizer constituted by a time domain transversal filter using continuously controlled weighting coefficients. The elementary linear equalizer has been described in many articles, in particular, these by R. W. Lucky entitled "Automatic equalization for digital communication" and "Techniques for adaptive equalization of digital communication system" published in the B.S.T.J. (April 65) 44 No. 4 pp 547–548 and (February 1966) 45 No. 2 pp 255–286. Such an equalizer is shown in FIG. 2 placed between a sampler 45, operating at a rate $1/\Delta T$ and delivering samples $x_{k-l}$, and a decision circuit 46 constituted by a threshold detector receiving samples $y_k$ of the equalized signal and providing estimates $a_k$ of the corresponding symbols. It comprises:

a multiply-tapped delay line 47 having a unit tap interval $\Delta T$ and receiving samples $x_{k-l}$ to be equalized;

multipliers 48 which multiply the samples $x_{k-l}, \ldots, x_k, \ldots, x_{k+n}$ available at the input, the intermediate taps and at the output of the delay line 47 by corresponding weighting coefficients $h_k^l \ldots, h_k^o \ldots, h_k^{-n}$;

a summing circuit 49 summing the weighted samples and supplying equalized signal samples $y_k$; and feed-back control loops, not shown, for determining the weighting coefficient.

The samples $y_k$ of the output signal are defined as a function of the samples $x_{k-l}, \ldots, x_k, \ldots, x_{k+n}$ of the input signal by the equation:

$$y_k = \sum_{j=-n}^{l} x_{k-j} h_k^j \tag{1}$$

This shows that the string of coefficients $h_k^j$ defines the discrete impulse response of the equalizer at instant $k\Delta T$. It is usual to represent this in reduced vector form by designating $\vec{X}_k$ as the single column matrix associated with the vector whose components are the input signal samples stored in the delay line 47 at instant, $k\Delta T$, and whose transpose $X_k^t$ is $$X_k^t = [x_{k-l}, \ldots, x_k, \ldots, x_{k-n}]$$

and by designating $\vec{H}_k$ as the single column matrix associated with the vector whose components are the weighting coefficients of the same instant, and whose transpose $H_k^t$ is:

$$H_k^t = [h_k^l, \ldots, h_k^o, \ldots, h_k^{-n}]$$

The scalar quantity $y_k$ is:

$$y_k = \vec{H}_k^t \cdot \vec{X}_k \tag{2}$$

Self-adaptation consists in modifying the weighting coefficients over time, i.e., modifying the components of the vector H in such a manner as to reduce the differences between the equalized signal $y_k$ and the value $a_k$ estimated for it by the decision circuit or its exact value $a_k$ when this is known at the receiver. To do this the vector H is updated at the rate $1/\Delta T$ using an algorithm defined by a linear equation of first order differences. One of the algorithms most used, known as the gradient algorithm, is defined by the vector equation:

$$\vec{H}_{k+1} = \vec{H}_k - \mu(y_k - \hat{a}_k)\vec{X}_k^* \tag{3}$$

As is conventional, the asterisk indicates a complex conjugate of the original term, $\mu$ is a positive constant representing an increment step size and $(y_k - a_k)$ is an error function.

For further details for these algorithms reference can be made to the article by C. Macchi, J. R. Jouannaud and O. Macchi entitled "Récepteurs adaptatifs pour transmissions de données" (Adaptive receivers for data transmissions) which appeared in the journal "Annales des télécommunications", 30, n° 9-10, 1975 pp 311-330.

Figure 3:
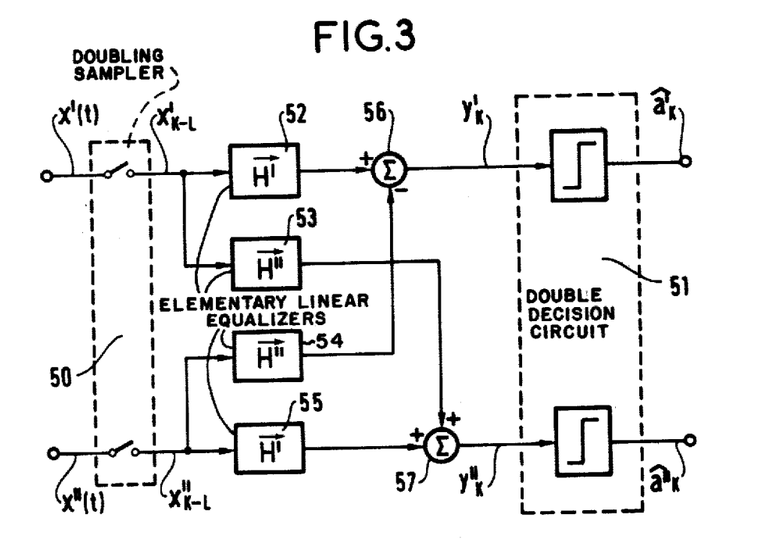
FIG. 3 is a block diagram of an complex linear equalizer.

A complex linear equalizer performs the same operation on a complex signal, i.e. on two independent real signals considered as the real and imaginary parts of a complex signal, as does the preceding linear equalizer on one real signal. The complex equalizer has two parallel inputs and two parallel outputs. It is shown in FIG. 3 preceded by a double sampler 50 and followed by a double decision circuit 51.

The double sampler operates at the rate $1/\Delta T$ and supplies samples $x'_{k-l}$ and $x''_{k-l}$ in parallel of two independent input signals.

The decision circuit 51 delivers parallel estimates $\hat{a}'_k$ and $\hat{a}''_k$ of the samples $y'_k$ and $y''_k$ delivered by the complex linear equalizer on its two parallel outputs.

The complex linear equalizer is constituted by four elementary linear equalizers 52, 53, 54, and 55 and by two summing circuits 56 and 57. The elementary equalizers 52, 53, 54, and 55 have identical delay lines. In respective pairs 52 and 55 or 53 and 54, they have the same sets of coefficients $\vec{H}'$ or $\vec{H}''$. The inputs to the elementary equalizers 52 and 53 are connected in parallel and receive the samples $x'_{k-l}$. Likewise the elementary equalizers 54 and 55 receive the samples $x''_{k-l}$. The outputs of the elementary equalizers 53 and 55 are connected by the summing circuit 57 which adds their output signals and supplies the samples $y''_k$ at its output. The summing circuit 56 has a plus-input connected to the elementary equalizer 52 and a minus-input connected to the elementary equalizer 54 and supplies the samples $y'_k$ at its output.

Repeating the notation used above for the elementary lineary equalizer, the output signal samples $y'_k$ and $y''_k$ may be expressed as follows:

$$y'_k = \vec{H}'^t_k \cdot \vec{X}'_k - \vec{H}''^t_k \cdot \vec{X}''_k$$

$$y''_k = \vec{H}'^t_k \cdot \vec{X}''_k + \vec{H}''^t_k \cdot \vec{X}'_k$$

where $\vec{X}'_k$ is by definition the vector whose components are $x'_{k-l}, \ldots, x'_k, \ldots, x'_{k+n}$, and $\vec{X}''_k$ is the vector whose components are $x''_{k-l}, \ldots, x''_k, \ldots, x''_{k+n}$.

Using complex notation:

$$y_k = y'_k + iy''_k$$

$$\vec{H}_k = \vec{H}'_k + i\vec{H}''_k$$

$$\vec{X}_k = \vec{X}'_k + i\vec{X}''_k$$

one obtains:

$$y_k = \vec{H}_k^t \cdot \vec{X}_k$$

This equation is the complex version of equation (2).

The real/complex analogy between the elementary linear equalizer and the complex linear equalizer holds for the algorithms used for self-adaptation of the coefficients. The gradient algorithm is defined by a linear equation of first order differences of the same form as equation (3), but this time the magnitudes are complex magnitudes.

$$\vec{H}_{k+1} = \vec{H}_k - \mu(y_k - \hat{a}_k)\vec{X}_k^* \tag{4}$$

where $\hat{a}_k$ is a complex term defined as:

$$\hat{a}_k = \hat{a}'_k + i\hat{a}''_k$$

which, as in the case of the elementary equalizer may be replaced by its exact value $a_k$ when this is known at the receiver; the asterisks indicate a complex conjugate of the base term.

For further details on complex self-adaptive linear equalizers, their algorithms for self-adaptation, and the justification of their use for equalizing two independent channels in quadrature whether obtained by amplitude modulation of two carriers in quadrature or by simultaneous processing of a real signal and its Hilbert transform, reference should be made to the above mentioned literature, and in particular to the article by C. Macchi, J. P. Jouannaud, and O. Macchi.

Figure 4:
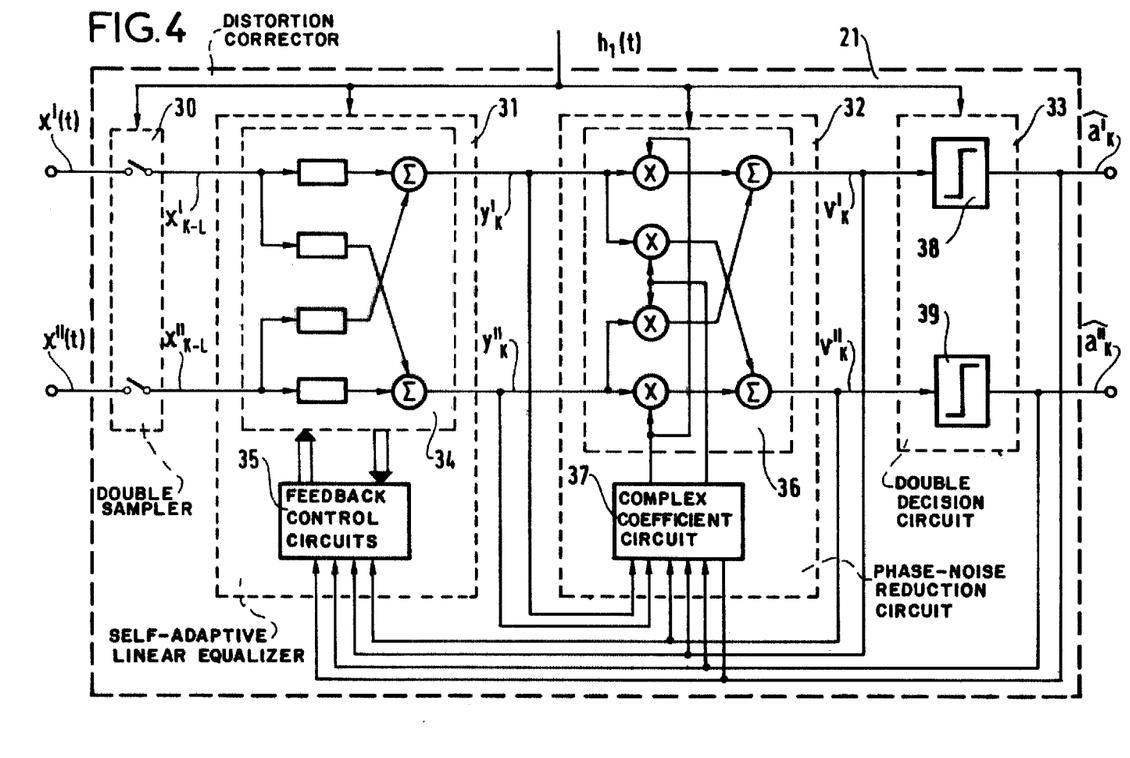
FIG. 4 shows the distortion correction circuit of FIG. 1 in greater detail.

After this reminder we return to the distortion corrector 21 of FIG. 1, of which one embodiment is shown in FIG. 4 preceded by a double sampler 30 and followed by a double decision circuit 33. In the figure, in between the double sampler 30 and the double decision circuit 33, there can be seen a long self-adaptive linear equalizer 31, followed by a phase-noise reduction circuit 32.

The double digital sampler 30 receives demodulated signals $x'(t)$ and $x''(t)$ on two independent paths coming from the synchronous demodulator (20 FIG. 1) and delivers pairs of samples $x'_{k-l}$ and $x''_{k-l}$ at its output at a rate of $1/\Delta T$ equal to the modulation rate $h_1(t)$ supplied by the clock recovery circuit (24 FIG. 1).

The long self-adaptive complex linear equalizer 31 corrects linear amplitude distortion and linear group propagation delay distortion introduced by the transmission channel, and at its output it delivers pairs of samples $y'_k$ and $y''_k$ of the equalized signals which, in the complex notation used above when recalling complex linear equalizers, may be written:

$$y_k = \vec{H}_k^t \cdot \vec{X}_k$$

The phase noise reducing circuit 32 multiplies the complex signal $y_k$ which it receives from the long self-adaptive complex linear equalizer 31 by a complex coefficient $m_k$ whose modulus is very close to unity, such that $1/m_k$ can be taken to be equal to $m^*_k$ in the following. It delivers pairs of samples $v'_k$ and $v''_k$ which may be written:

$$v_k = v'_k + iv''_k = m_k y_k = m_k \vec{H}_k^t \cdot \vec{X}_k$$

The decision circuit 33 is constituted by two threshold circuits 38 and 39 which supply the estimated components $\hat{a}'_k$ and $\hat{a}''_k$ of the complex transmitted signal in response to the components $v'_k$ and $v''_k$ of the complex signal as received and processed by the distortion correction circuit. Throughout the remainder of the description, these estimated components $\hat{a}'_k$ and $\hat{a}''_k$ may be replaced by the components $a'_k$ and $a''_k$ of the transmitted signal when these are known at the receiver, as actually occurs in practice during the setting-up period which precedes effective transmission of data.

The long self-adaptive complex linear equalizer 31 is represented in outline in FIG. 4 as a block 34 containing the four elementary equalizers which constitute it and a block 35 containing the feed-back control circuits which perform the self-adaptation of the coefficients of the elementary equalizers. The structure and the connections of the block 35 are determined by the usual techniques on the basis of the algorithm used for self-adaptation of the coefficients. The coefficients are adapted in such a manner as to minimize an error signal defined by the differences between the received symbols $v_k$ applied to the decision circuit 33 and the estimated symbols $\hat{a}_k$ supplied therefrom. The algorithm may be the gradient algorithm relying on a linear equation of first order differences of the form:

$$\vec{H}_{k+1} = \vec{H}_k - \mu(v_k - \hat{a}_k)\vec{X}^*_k$$

or preferably of the form:

$$\vec{H}_{k+1} = \vec{H}_k - \mu(v_k - \hat{a}_k)m^*_k \vec{X}^*_k$$

In the latter case, implementation of the algorithm requires the input of the block 35 to be connected not only to the input and the output of the decision circuit 33 but also to the circuit 37 which supplies the complex coefficient $m_k$ to the phase noise reduction circuit 32. By multiplying the error signal by the complex conjugate of the coefficient $m_k$ it is possible to avoid taking into consideration the corrections applied by the phase noise reduction circuit 32 when adjusting the coefficients of the long self-adaptive complex linear equalizer 31, and thereby decorrelate the operation of the long self-adaptive complex linear equalizer 31 and the phase noise reduction circuit 32.

The last equation can also be put in the form:

$$\vec{H}_{k+1} = \vec{H}_k - \mu(y_k - \hat{a}_k m^*_k)\vec{X}_k$$

which leads to a different embodiment of the block 35 by replacing its input signal $v_k$ with the signal $y_k$.

The phase noise reduction circuit 32 is constituted by a complex multiplier 36 and a feed-back control circuit 37 which provides its complex coefficient $m_k$ by using an algorithm defined by a linear difference equation of the form:

$$m_{k+1} = [m_k - \lambda(v_k - \hat{a}_k)y^*_k] \exp[-iF_k(\epsilon_j)] \quad (5)$$

in which $\epsilon_j$ is an error signal derived from the phase difference between the symbol applied to the decision circuit and the symbol estimated by the decision circuit at the instant $j\Delta T + t_o$ (where $t_o$ is the instant taken as the origin of time measurements at the receiver) and where $F_k(\epsilon_j)$ is a linear function of at least the error signals $\epsilon_k$ and $\epsilon_{k-1}$.

Implementing a conventional gradient algorithm would give a coefficient $g_k$ defined by a linear difference equation of the form:

$$g_{k+1} = g_k - \lambda(v_k - \hat{a}_k)y^*_k$$

Now it turns out that with such an algorithm it is not possible to compensate for a large frequency drift, for example greater than 1/1000th of $1/\Delta T$. That is why one is constrained to provide extra phase correction and to make use of a complex coefficient of the form: $g_k \exp(i\hat{\theta}_k)$. To avoid taking account of this phase correction in the feed-back control loop which supplies the coefficient $g_k$, the error $(v_k - \hat{a}_k)$ is multiplied by the opposite phase angle $\exp(-i\hat{\theta}_k)$ so that $g_k$ is generated by an algorithm of the form:

$$g_{k+1} = g_k - \lambda(v_k - \hat{a}_k)y^*_k \exp(-i\hat{\theta}_k)$$

The phase correction angle $\hat{\theta}_k$ is provided by a feed-back control system for which the frequency drift is a speed error. This control system must thus be of second or higher order. It is defined by a linear difference equation of the form:

$$\hat{\theta}_{k+1} = \hat{\theta}_k - F_k(\epsilon_j)$$

in which $F_k(\epsilon_j)$ is a linear function of the error signals $\epsilon_j$.
From which it follows:

$$g_{k+1} \exp(i\hat{\theta}_{k+1}) = [g_k - \lambda(v_k - \hat{a}_k)y^*_k \exp(-i\hat{\theta}_k)] \times \exp[i(\hat{\theta}_k - F_k(\epsilon_j))]$$

putting $$m_k = g_k \exp(+i\hat{\theta}_k)$$

one obtains $$m_{k+1} = [m_k - \lambda(v_k - \hat{a}_k)y^*] \exp[-iF_k(\epsilon_j)]$$

which is equation (5).

Advantageously the funtion $F_k(\epsilon_j)$ is of the form:

$$F_k(\epsilon_j) = \gamma_1 \epsilon_k + \gamma_2 \sum_{j=-\infty}^{k} \epsilon_j \quad (6)$$

where $\gamma_1$ and $\gamma_2$ are positive constants.

The error signal $\epsilon_j$ derived from the frequency difference between the symbols applied to the decision circuit 33 and the estimated symbols provided thereby is taken to be equal to:

$$\epsilon_j = Im(v_j \hat{a}^*_j) = v''_j a'_j - v'_j a''_j \quad (7)$$

Thus, if $\theta_j$ is the phase error affecting the symbol $y_j$ delivered by the long complex linear equalizer 31 multiplied by the complex coefficient $g_j$ then:

$$\sin \epsilon_j = \sin(\hat{\theta}_j - \theta_j) = Im[\exp(-i\theta_j) \exp i\hat{\theta}_j]$$

and taking into account the definition of $\theta_j$:

$$y_j g_j \approx \hat{a}_j \exp(-i\theta_j)$$

$$\sin \epsilon_j = Im[(y_j g_j / \hat{a}_j) \exp(i\hat{\theta}_j)]$$

Observing that the output signal $v_j$ of the phase noise reduction circuit 32 is assumed to be equal to:

$$v_j = y_j g_j \exp(i\hat{\theta}_j),$$

one obtains $$\sin \epsilon_j = Im(v_j/\hat{a}_j) = (1/|\hat{a}_j|^2) Im(v_j \hat{a}^*_j)$$

which shows that the sine of the phase error $\epsilon_j$ is a function of the quantity (7).

As long as the feed-back control of the phase is operating properly, the residual phase error $\epsilon_k$ is small and may be taken to be equal to its sine. Further, the terms in $1/|\hat{a}_j|^2$ vary much more rapidly than the terms in $Im(v_j \hat{a}^*_j)$. Given the scrambling used at the transmission end, these terms tend, over a short time interval with respect to the speed of variation of the terms in $Im(v_j \hat{a}^*_j)$, towards a constant average value such that they may be replaced in equation (6) by their average value which can then be taken into account in the coefficients $\gamma_1$ and $\gamma_2$ which become $\gamma'_1$ and $\gamma'_2$. One then obtains the function $F_k(\epsilon_j)$ in the form:

$$F_k(\epsilon_j) = \gamma_1' Im(v_k \hat{a}_k^*) + \gamma_2' \sum_{j=-\infty}^{k} Im(v_j \hat{a}_j^*)$$

The coefficients $\gamma'_1$ and $\gamma'_2$ are conventionally determined by working on the z transforms of the linear difference equations:

$$\hat{\theta}_{k+1} = \hat{\theta}_k - \gamma_1' \epsilon_k - \gamma_2' \sum_{j=-\infty}^{k} \epsilon_j$$

to obtain phase control which is genuinely second order (class 2) and whose passband in open loop operation is preferably limited to about three times the maximum admissable drift value.

Figure 5:
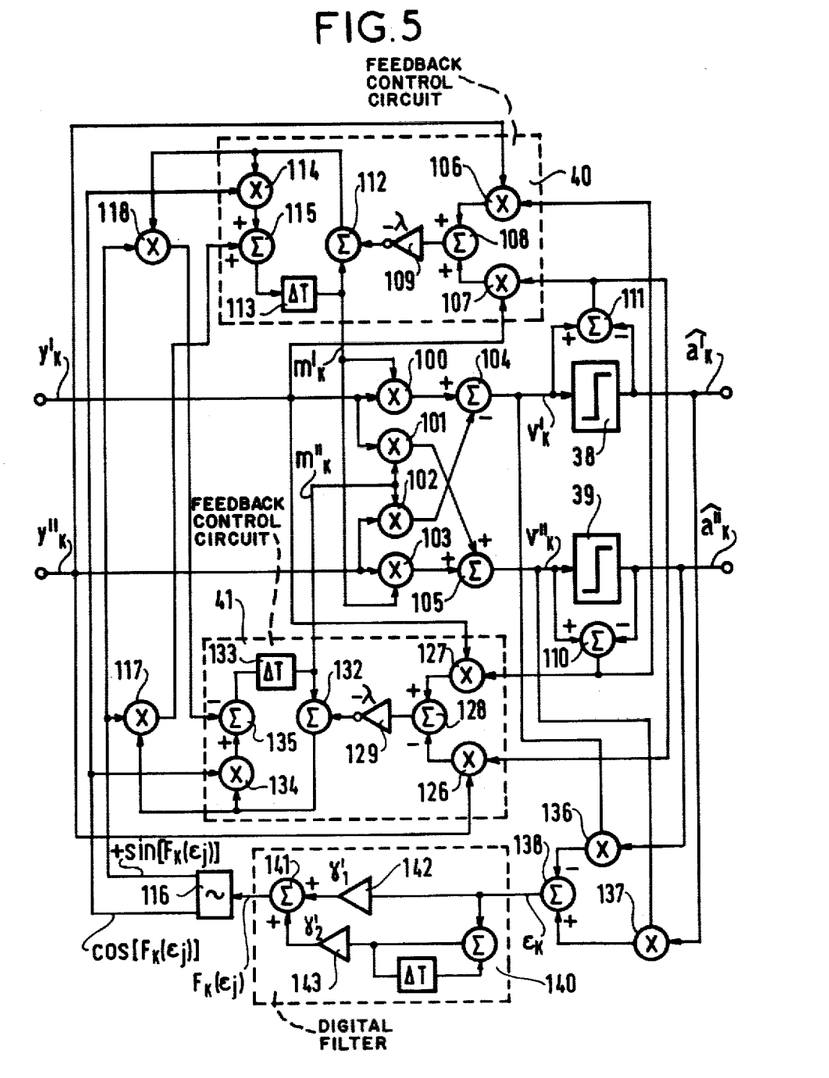
FIG. 5 is the circuit diagram of a phase noise reduction circuit useable with the distortion correction circuit of FIG. 4 and implementing the method in accordance with the invention.

FIG. 5 is a detailed example of the phase noise reducing circuit shown in FIG. 4. It comprises a complex multiplier 36 with two complex inputs and constituted by four elementary multipliers 100, 101, 102, and 103 and two summing circuits 104 and 105, each having two inputs, and one of which, 104, has one of its inputs as its subtractive input. On a first input this complex multiplier receives the complex signal $y'_k + iy''_k$ from the long self-adaptive complex linear equalizer (31 FIG. 4) and on its second input it receives the complex coefficient $m'_k + im''_k$ and at its output it delivers the complex signal:

$$v'_k + iv''_k = (y'_k + iy''_k)(m'_k + im''_k)$$

The real part $m'_k$ of the complex coefficient is delivered by a feed-back control circuit 40. This circuit includes two input multipliers 106, 107 with their outputs connected via a summing circuit 108 to an inverting amplifier 109 which applies a weighting coefficient $-\lambda$ to the signal passing through and leads to a digital integration loop which delivers the signal $m'_k$.

The multiplier 106 has two inputs, one connected to that an input of the phase noise reduction circuit at which the signal $y''_k$ is available and the other connected to the output of a summing circuit 110 having two inputs, one an additive input connected to that input of the threshold circuit 39 of the decision circuit (33 FIG. 4) at which the signal $V''_k$ is available, and the other being a subtractive input connected to that output of the same threshold circuit 39 at which the component $\hat{a}''_k$ of the estimated symbol is available. Its output signal is:

$$(v''_k - \hat{a}''_k) y''_k$$

The multiplier 107 has two inputs, one connected that input of the phase noise reduction circuit at which the signal $y'_k$ is available, the other connected to the output of a summing circuit 111 having two inputs, one being an additive input connected to that input of the threshold circuit 38 of the decision circuit (33 FIG. 4) at which the signal $v'_k$ is available, and the other being an subtractive input connected to that output of the same threshold circuit 38, at which the component $\hat{a}'_k$ of the estimated signal is available. Its output signal is equal to:

$$(v'_k - \hat{a}'_k) y'_k$$

The inverting amplifier 109 provides the signal $$-\lambda[(v''_k - \hat{a}''_k) y''_k + (v'_k - \hat{a}'_k) y'_k]$$

which may be written as $$-\lambda Re[(v_k - \hat{a}_k) y^*_k]$$

The digital integration loop following the inverting amplifier 109 is closed by a summing circuit 112. In conventional manner it includes a delay circuit 113 introducing a delay $\Delta T$, and it further includes a multiplier 114 and a summing circuit 115 inserted after the output of the summing circuit 112 and the delay circuit 113. The summing circuit 112 has an output signal equal to $$m'_k - \lambda Re[(v_k - \hat{a}_k) y^*_k]$$

The multiplier 114 receives this signal on one input and on the other input it receives the signal $$\cos [F_k(\epsilon_j)]$$

delivered by a trigonometrical function generator 116, and delivers an output signal equal to:

$$(m'_k - \lambda Re[(v_k - \hat{a}_k) y^*_k]) \cos [F_k(\epsilon_j)]$$

The summing circuit 115 receives this signal on one input and on the other input it receives a signal from the multiplier 117 which, as will be shown below provides a signal equal to:

$$(m''_k - \lambda Im[(v_k - \hat{a}_k) y^*_k]) \sin [F_k(\epsilon_j)]$$

and delivers a signal equal to:

$$m'_{k+1} = Re[(m_k - \lambda(v_k - \hat{a}_k) y^*_k) \exp(-iF_k(\epsilon_j))] \quad (8)$$

The signal at the output of the summing circuit 112 is also applied to one input of $\alpha$ multiplier 118 whose other input receives the signal:

$$\sin [F_k(\epsilon_j)]$$

delivered by the trigonometrical function generator 116 and supplies the signal:

$$(m'_k - \lambda Re[(v_k - \hat{a}_k) y^*_k]) \sin [F_k(\epsilon_j)]$$

used as mentioned above for generating the imaginary part of the coefficient $m_k$.

The imaginary part $m''_k$ of the complex coefficient of the phase noise reduction circuit is generated by a feed-back control circuit 41 of similar structure to the feed-back control circuit 40. The feed-back control circuit 41 has two multipliers 126 and 127 at its input with their outputs connected via a summing circuit 128 to an inverting amplifier 129 which applies a weighting coefficient $-\lambda$ to the signal passing therethrough and leads to a digital integration loop which delivers the signal $m''_k$.

The multiplier 126 has two inputs, one of which is connected to that input of the phase noise reduction circuit at which the signal $y''_k$ is available, and the other of which is connected to the output of the summing circuit 111 where the signal $v'_k - \hat{a}'_k$ is available. Its output signal is:

$$(v'_k - \hat{a}'_k)y''_k$$

The multiplier 127 has two inputs, one connected to that input of the phase noise reduction circuit at which the signal $y'_k$ is available, and the other connected to the output of the summing circuit 110 at which the signal $v''_k - \hat{a}''_k$ is available. Its output signal is:

$$(v''_k - \hat{a}''_k)y'_k$$

The summing circuit 128 has an additive input connected to the output of the multiplier 127 and a subtractive input connected to the output of the multiplier 126 such that the inverting amplifier 129 delivers the signal equal to:

$$-\lambda[(v''_k - \hat{a}''_k)y'_k - (v'_k - \hat{a}'_k)y''_k]$$

which may be written $$-\lambda Im[(v_k - \hat{a}_k)y^*_k]$$

The digital integration loop following the inverting amplifier 129 is closed by a summing circuit 132. It includes a delay circuit 133 which introduces a delay $\Delta T$, and further includes a multiplier 134 and a summing circuit 135 inserted between the output of the summing circuit 122 and the delay circuit 133. The summing circuit 132 delivers an output signal equal to:

$$m''_k - \lambda Im[(v_k - \hat{a}_k)y^*_k]$$

The multiplier 134 receives this signal on one input and on the other input it receives the signal:

$$\cos[F_k(\epsilon_j)]$$

delivered by the trigonometrical function generator 116 and supplies an output signal equal to:

$$(m''_k - \lambda Im[(v_k - \hat{a}_k)y^*_k]) \cos[F_k(\epsilon_j)]$$

The summing circuit 135 receives this signal on an additive input and on a subtractive input it receives the signal:

$$(m'_k - \lambda Re[(v_k - \hat{a}_k)y^*_k]) \sin[F_k(\epsilon_j)]$$

delivered by the multiplier 118, and at its output it supplies a signal $m''_{k+1}$ where;

$$m''_{k+1} = Im[(m_k - \lambda(v_k - \hat{a}_k)y^*_k) \exp(-iF_k(\epsilon_j))] \quad (9)$$

Equations (8) and (9) may be combined into an single equation defining the complex coefficient $m_{k+1}$ as follows:

$$m_{k+1} = [m_k - \lambda(v_k - \hat{a}_k)y^*_k] \exp(-iF_k(\epsilon_j))$$

which is identical to equation (5) given above.

The signal of the output of the summing circuit 132 is also applied to the multiplier 117 which has another input connected to receive the signal:

$$\sin[F_k(\epsilon_j)]$$

delivered by the trigonometrical function generator 116 and on its output it supplies the signal $$(m''_k - \lambda Im[(v_k - \hat{a}_k)y^*_k]) \sin[F_k(\epsilon_j)]$$

which is used to generate the real part of the coefficient $m_k$.

The function $F_k(\epsilon_j)$ is delivered to the trigonometrical function generator 116 via a digital filter 140 having two parallel branches connected together at their output by a summing circuit 141, one of the branches includes an amplifier 142 applying a weighting coefficient $\gamma'_1$ to the signal which passes therethrough while the other branch includes a digital integrator followed by an amplifier 143 which applies a coefficient $\gamma'_2$ to the signal passing therethrough. The digital filter 140 receives an input magnitude $\epsilon_k$ and delivers an output signal $F_k(\epsilon_j)$ defined by the equation:

$$F_k(\epsilon_j) = \gamma_1' \epsilon_k + \gamma_2' \sum_{j=-\infty}^{k} \epsilon_j$$

The input signal $\epsilon_k$ of the digital filter 140 (FIG. 5) is supplied by two multipliers 136 and 137 whose outputs are interconnected by a summing circuit 138. The multiplier 136 has two inputs, one connected to that output of the threshold circuit 39 of the decision circuit at which the component $\hat{a}''_k$ of the estimated symbols is available and the other connected to the output of the summing circuit 104 and which the signal $v'_k$ is available. The multiplier 136 has two inputs, one connected to that output of the threshold circuit 38 of the decision circuit at which the components $\hat{a}'_k$ of the estimated symbols is available while the other input is connected to the output of the summing circuit 105 at which the signal $v''_k$ is available. The multiplier 136 is connected to a subtractive input of the summing circuit 138 while the multiplier 137 is connected to an additive input of the same summing circuit 138 such that the signal available at the output of the summing circuit is:

$$\epsilon_k = v''_k \hat{a}'_k - v'_k \hat{a}''_k = Im(v_k a^*_k)$$

The embodiment of the phase noise reduction circuit which has just been described, has been described in the context of data transmission using amplitude modulation of two carriers in quadrature and using two independent quadrature channels for transmission. However, it could be used in single channel data transmission, with the equations remaining appropriate provided that firstly, the Hilbert transform of the signal in the single channel is generated and is then taken to be the signal from the quadrature channel, followed by taking the Hilbert transform again of the quadrature channel signal after processing and subtracting it from the single channel signal, and secondly the imaginary part $\hat{a}''_k$ of the estimated symbols is removed from any equations in which they occur.

We claim:

1. A method of reducing phase noise at the receiver end of a data transmission system operating at a modulation rate $1/\Delta T$ and comprising, at the receiver, a decision circuit for supplying an estimate of the originally transmitted symbols on the basis of the symbols actually received, wherein before application to the decision circuit, the received symbols are put into complex form with an in-phase component and a quadrature component, and are then multiplied by a complex coefficient defined by an equation having the form:

$$m_{k+1} = [m_k - \lambda(v_k - \hat{a}_k)y^*_k] \exp[-iF_k(\epsilon_j)]$$

where:

$\lambda$ is a real coefficient;

$y^*_k$ is the complex conjugate of the symbol received at instant $k\Delta T + t_o$ (where $t_o$ is the instant taken as the origin of time measurements);

$v_k$ is the symbol applied to the decision circuit at said instant;

$\hat{a}_k$ is the estimated value of the received symbol;

$\epsilon_j$ is an error signal derived from the phase difference between the symbol applied to the decision circuit and the symbol estimated by the decision circuit at instant $j\Delta T + t_o$; and $F_k(\epsilon_j)$ is a linear function of at least the error signals $\epsilon_j$.

2. A method according to claim 1, wherein the function $F_k(\epsilon_j)$ appearing in the definition of the said complex coefficient has the form:

$$F_k(\epsilon_j) = \gamma'_1 \epsilon_k + \gamma'_2 \sum_{j=-\infty}^{k} \epsilon_j$$

where $\gamma'_1$ and $\gamma'_2$ are real constants.

3. A method according to claim 1, wherein the error signal is taken to be equal to the imaginary part of the complex product of the symbol applied to the input of the decision circuit and the complex conjugate of the estimated version thereof.

4. A method according to claim 1 for data transmission including, at the receiver end before the decision circuit, a long self-adaptive complex linear equalizer for correcting linear amplitude distortion and linear group propagation delay distortion due to the channel used by the transmission, wherein the coefficients of the long self-adaptive complex linear equalizer and modified using an error signal derived from the differences between the symbols applied to the decision circuit and the estimates it makes thereof, the said differences being multiplied by the complex conjugates of the said complex coefficients.

5. Apparatus for reducing phase noise at the receiver end of a data transmission system for transmitting multi value symbols at a modulation rate $1/\Delta T$, the system including, at the receiver end, a decision circuit for supplying an estimate of the originally transmitted symbols on the basis of the symbols actually received, and means prior to the decision circuit for putting the received symbols into complex form $y_k$ with an in-phase component $y'_k$ and a quadrature component $y''_k$, said apparatus for reducing phase noise comprising means for generating a complex phase noise correction coefficient $m_k$ and means for performing complex multiplication of the received symbol in complex form times the complex correction coefficient to obtain a phase noise reduced symbol in complex form for application to the decision circuit, the complex phase noise correction coefficient $m_k$ being generated by said means according to an equation having the form:

$$m_{k+1} = [m_k - \lambda(v_k - \hat{a}_k)y^*_k] \exp[-iF_k(\epsilon_j)]$$

where:

$\lambda$ is a real coefficient;

$y^*_k$ is the complex conjugate of the symbol received at instant $k\Delta T + t_o$ (where $t_o$ is the instant taken as the origin of time measurements);

$v_k$ is the symbol applied to the decision circuit at said instant;

$\hat{a}_k$ is the estimated value of the received symbol;

$\epsilon_j$ is an error signal derived from the phase difference between the symbol applied to the decision circuit and the symbol estimated by the decision circuit at instant $j\Delta T + t_o$; and $F_k(\epsilon_j)$ is a linear function of at least the error signals $\epsilon_j$.

6. Apparatus for reducing phase noise according to claim 5, comprising:

means for generating the in-phase component $m'_k$ and the quadrature component $m''_k$ of the complex phase noise correction coefficient $g_k$, and a first complex multiplier for multiplying each of the symbol components $y'_k$ and $y''_k$ by each of the connection coefficient components $m'_k$ and $m''_k$ and then subtracting the quadrature times quadrature product from the in-phase times in-phase product to obtain a phase noise reduced in-phase symbol component $v'_k$ for application to the decision circuit, and summing both of the in-phase times quadrature products to obtain a phase noise reduced quadrature symbol component $v''_k$ for application to the decision circuit, the means for generating the complex phase noise correction coefficient comprising:

means for obtaining an in-phase amplitude error component and a quadrature amplitude error component by subtracting the in-phase component $\hat{a}'_k$ and quadrature component $\hat{a}''_k$ of the value of the received symbol as estimated by the decision circuit from the corresponding in-phase and quadrature components $v'_k$ and $v''_k$ applied thereto by the first complex multiplier;

a second complex multiplier for multiplying each of the received symbol components $y'_k$ and $y''_k$ by each of the amplitude error components and then summing the quadrature times quadrature product with the in-phase times in-phase product to obtain an in-phase intermediate signal from which the in-phase component $m'_k$ of the phase noise correction coefficient is generated, and subtracting the quadrature received symbol component $y''_k$ times the in-phase error component product from the in-phase received symbol component $y'_k$ times the quadrature error component product to obtain a quadrature intermediate signal from which the quadrature component $m''_k$ of the phase noise correction coefficient is generated;

means for deriving a phase error signal $\epsilon_k$ by subtracting the product of the noise reduced in-phase symbol component $v'_k$ multiplied by the estimated quadrature symbol component $\hat{a}''_k$ from the product of the noise reduced quadrature symbol component $v''_k$ multiplied by the estimated in-phase symbol component $\hat{a}'_k$;

a filter having two branches both receiving the phase error signal $\epsilon_k$, one branch multiplying the phase error signal $\epsilon_k$ by a first constant coefficient $\gamma_1$, and the other branch comprising an integrator followed by a multiplier arranged to multiply the integral by a second constant coefficient $\gamma_2$, the signals available from the two branches of the filter being summed to provide a filter output signal $F_k(\epsilon_j)$ which is applied as an input signal to a trigonometrical function generator capable of providing a sine signal, $\sin[F_k(\epsilon_j)]$, equal to the sine of its input signal and a cosine signal, $\cos[F_k(\epsilon_j)]$, equal to the cosine of its signal; and first and second, similar component generators for generating the in-phase and quadrature components of the phase noise correction co-efficient $m_k$ on the basis of said sine and cosine signals and of respective ones of said intermediate signals, each of said generators comprising: a weighting multiplier to multiply its input intermediate signal by a constant coefficient, $-\lambda$; means for summing the resulting weighted intermediate signal with the output correction coefficient component $m'_k$ or $m''_k$ of the generator obtained via integrator delay means to provide a first sum signal; means for multiplying the first sum signal both by the sine signal and by the cosine signal to obtain respective sine product and cosine product signals; and, in the in-phase component generator, means for summing the cosine product signal of the in-phase generator with sine product signal of the quadrature generator to obtain a second sum signal which is applied to the input of the in-phase integrator delay means whose output provides the in-phase correction coefficient component $m'_k$; and, in the quadrature component generator, means for subtracting the sine product signal of the in-phase generator from the cosine product signal of the quadrature generator to obtain a difference signal which is applied to the input of the quadrature integrator delay means whose output provides the quadrature correction coefficient component $m''_k$.

7. Apparatus according to claim 6, wherein the integrator is a digital integrator having a feed back loop with a delay $\Delta T$, and the integration delay means also have a delay $\Delta T$.

* * * * *